US006973533B2

(12) United States Patent
Dahman et al.

(10) Patent No.: US 6,973,533 B2
(45) Date of Patent: Dec. 6, 2005

(54) DATA STORAGE DEVICE PROVIDING COMMUNICATION BETWEEN PROCESSING UNITS

(75) Inventors: Kirby Grant Dahman, Tucson, AZ (US); Kenneth Fairclough Day, III, Tucson, AZ (US); Douglas William Dewey, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 10/225,311

(22) Filed: Aug. 20, 2002

(65) Prior Publication Data

US 2003/0009645 A1 Jan. 9, 2003

Related U.S. Application Data

(62) Division of application No. 09/322,010, filed on May 28, 1999, now Pat. No. 6,473,829.

(51) Int. Cl.[7] ............................................ G06F 12/00
(52) U.S. Cl. .................. 711/112; 711/162; 711/154; 707/203; 714/6; 709/246
(58) Field of Search ..................... 711/161, 165, 112, 711/111, 114, 162; 709/208, 248, 246; 707/8, 707/10, 200, 201–204; 714/6, 15

(56) References Cited

U.S. PATENT DOCUMENTS

| | | | |
|---|---|---|---|
| 5,084,863 A | 1/1992 | Guezou et al. ............. 370/22.3 |
| 5,155,845 A | 10/1992 | Beal et al. ...................... 714/6 |
| 5,222,217 A | 6/1993 | Blount et al. ................ 707/204 |
| 5,251,213 A | 10/1993 | Videlock et al. ............ 370/403 |
| 5,327,431 A | 7/1994 | Heske, III et al. .......... 370/403 |
| 5,404,501 A | 4/1995 | Carr et al. ................... 709/314 |
| 5,408,470 A | 4/1995 | Rothrock et al. ........... 707/512 |
| 5,446,871 A | 8/1995 | Shomler et al. ................ 714/1 |
| 5,574,849 A | 11/1996 | Sonnier et al. ............... 714/12 |
| 5,579,480 A | 11/1996 | Cidon et al. ................. 709/343 |
| 5,602,851 A | 2/1997 | Terashita et al. ............ 370/403 |
| 5,689,706 A | 11/1997 | Rao et al. .................... 707/201 |
| 5,761,439 A | 6/1998 | Kar et al. .................... 709/233 |
| 5,806,075 A * | 9/1998 | Jain et al. .................... 707/201 |
| 5,862,346 A | 1/1999 | Kley et al. ................... 709/200 |

(Continued)

FOREIGN PATENT DOCUMENTS

EP          0 848339          6/1998

(Continued)

OTHER PUBLICATIONS

"Using Prediction to Accelerate Coherence Protocols", Mukherjee et al, IEEE Transactions, 1998.*

(Continued)

*Primary Examiner*—Pierre-Michel Bataille
(74) *Attorney, Agent, or Firm*—John H. Holcombe

(57) ABSTRACT

A system and method, employing a data storage device, for providing communication between a plurality of processing units which are respectively unconnected to each other, with the processing units each separately coupled to the data storage device. A data storage device controller coupled to storage interfaces and to a buffer, recognizes "broadcast" commands and any message accompanying the "broadcast" commands, and recognizes "read message" commands, received from the processing units. The controller stores the message accompanying the "broadcast" command in the buffer, and forwards, at the storage interfaces, a "message ready" signal to at least one of the processing units. The processing units then send a "read message" command to the data storage device. The controller responds to a "read message" command at one of the storage interfaces, supplying the message stored in the buffer at the storage interface to the sending processing unit.

31 Claims, 5 Drawing Sheets

U.S. PATENT DOCUMENTS

| | | | | |
|---|---|---|---|---|
| 5,884,325 | A | | 3/1999 | Bauer et al. ............... 707/201 |
| 5,895,493 | A | | 4/1999 | Gatica ....................... 711/147 |
| 5,924,096 | A | | 7/1999 | Draper et al. ............... 707/201 |
| 5,926,816 | A | | 7/1999 | Bauer et al. ............... 707/201 |
| 5,953,719 | A | * | 9/1999 | Kleewein et al. ............. 707/8 |
| 5,956,489 | A | | 9/1999 | San Andres et al. ........ 709/221 |
| 5,978,813 | A | | 11/1999 | Foltz et al. ................. 707/201 |
| 5,991,771 | A | | 11/1999 | Falls et al. .................. 707/201 |
| 6,000,000 | A | | 12/1999 | Hawkins et al. ........... 707/201 |
| 6,012,059 | A | * | 1/2000 | Neimat et al. ................ 707/8 |
| 6,052,797 | A | | 4/2000 | Ofek et al. ................. 709/219 |
| 6,061,741 | A | | 5/2000 | Murphy et al. ............ 709/203 |
| 6,065,018 | A | | 5/2000 | Beier et al. ................ 707/201 |
| 6,216,126 | B1 | * | 4/2001 | Ronstrom .................... 707/10 |
| 6,243,715 | B1 | * | 6/2001 | Bogantz et al. ............ 707/201 |
| 6,249,849 | B1 | | 6/2001 | Day et al. ................... 711/161 |
| 6,301,589 | B1 | * | 10/2001 | Hirashima et al. .......... 707/204 |
| 6,336,172 | B1 | | 1/2002 | Day et al. ................... 711/112 |
| 6,336,173 | B1 | | 1/2002 | Day et al. ................... 711/112 |
| 6,341,316 | B1 | | 1/2002 | Kloba et al. ................ 709/248 |
| 6,754,681 | B2 | * | 6/2004 | Brodersen et al. .......... 707/202 |
| 6,782,392 | B1 | * | 8/2004 | Weinberger et al. ..... 707/104.1 |
| 2002/0120717 | A1 | * | 8/2002 | Giotta ........................ 709/219 |

FOREIGN PATENT DOCUMENTS

| | | |
|---|---|---|
| EP | 0 876034 | 11/1998 |
| EP | 0 944009 | 9/1999 |
| WO | WO99/34422 | 5/1998 |
| WO | WO99/22322 | 5/1999 |

OTHER PUBLICATIONS

"Munin: Distributed Shared Memory Based on Type-Specific Memory Coherence", Bennett et al, ACM, 1990.*

"Introduction to Wireless Internet & Mobile Computing Market," Wireless Internet & Mobile Computing, 1999, http://www.wirelessinternet.com/introtol.htm.*

"Distributed Computing at WWW9", Dane Winer, http://davenet.scripting.com/1999/07/10/distributedComputingWww9, Jul. 1999.*

How Wireless Data Is Changing The Dynamics of Conferences and Meetings, Wireless Internet & Mobile Computing's, http://www.wirelessinternet.com/Conferences_Workshops.htm, 1995.*

"Fault-Tolerant Clock Synchronization in Distributed Systems", Ramanathan, et al., IEEE Computer Magazine, 10/90, pp. 33-42.

"Implementing Fault-Tolerant Services Using the State Machine Approach: A Tutorial", F. B. Schneider, ACM Computing Surveys, vol. 22, No. 4, 12/90,pp. 299-319.

Zeng, X. Et al., GloMoSim: A library for Parallel Simulation of Large-Scale Wireless Networks, IEEE Workshop on Parallel and Distributed Simulation, pp. 154-161, May 1998.

Rao et al., "A Transparent Service for Synchronized Replication Across Loosely-Connected File Systems", 2nd International Workshop on Services in Distributed & Network Environment, pp. 110-117.

* cited by examiner

DATA STORAGE DEVICE PROVIDING COMMUNICATION BETWEEN PROCESSING UNITS

DOCUMENTS INCORPORATED BY REFERENCE

This Application is a Divisional of prior application Ser. No. 09/322,010, filed on May 28, 1999, now U.S. Pat. No. 6,473,829.

Commonly assigned U.S. patent application Ser. No. 09/283,222, now U.S. Pat. No. 6,336,172, K. F. Day III et al., is incorporated for its showing of a data storage library system for storing and tracking multiple copies of data in system data storage libraries.

TECHNICAL FIELD

This invention relates to data storage systems having at least one data storage device with a peripheral interface coupled to a plurality of processing units, and, more particularly, to providing communication between the processing units.

BACKGROUND OF THE INVENTION

Data processing systems comprising at least one host typically require a large amount of data storage. If the data, typically stored as a data volume, is not immediately required by the hosts, for example, if the data volume is infrequently accessed, the storage of the data volume may be on removable rewritable data storage media, such as magnetic tape or optical disk, and the data volumes may be written and or read by means of a data storage drive.

The data storage drive is typically coupled to the host, or processing unit, by means of a peripheral interface in which commands are directed only from the processing unit to the data storage drive, and the data storage drive responds to those commands, performing the commanded functions. No commands can be sent by the data storage drive to the coupled processing unit. Typically, the commands are performed by a device controller.

Data processing systems having multiple hosts require larger amounts of data storage than can be efficiently handled by single data storage drives.

Data storage libraries typically provide efficient access to large quantities of data volumes stored in removable data storage media, the media stored in storage shelves which are accessed by robots under the control of robot controllers. Due to the large amount of stored data, typically, a plurality of hosts make use of the same data storage library, and a plurality of data storage drives are included in the library to allow access by the hosts. A library manager, which may comprise the same processor as the robot controller, typically tracks each data volume and the data storage media on which it is stored, and tracks the storage shelf location of each data storage media.

Herein, a library manager, either with or without the robot controller, is defined as a "controller" for the data storage library, as is the "controller" for a data storage device as discussed above.

An example of a data storage library system for redundantly storing and accessing data volumes stored on removable data storage media in a plurality of data storage libraries is described in the incorporated coassigned K. F. Day III et al. application, hereinafter, Day et al. application. The library controller of each library provides an updatable synchronization token directly associated with each data volume. A plurality of directors are provided, each separate from and coupled to the hosts and each separate from and coupled to each data storage library. Each director responds to separate, partitioned data storage drive addresses addressed by the hosts. The responding director supplies each data volume supplied from a host to all of the data storage libraries, and updates each synchronization token directly associated with the supplied data volume. Thus, the directors store duplicate copies of the data volume in the data storage libraries without involvement by the host. The currency of the data volumes are each tracked by means of the directly associated synchronization token, and the synchronization token is not tracked by the host.

In the instance where one copy of the data volume is down level and the corresponding synchronization token has not been updated, the responding director may identify the down level data volume to the other directors, so that the erroneous down level information is not transferred to hosts. The responding director may subsequently update the data volume and the corresponding synchronization token.

A specialized communication system may be installed between the directors, but would require a significant upgrade to the directors and their interfaces, and, in order to provide a level of redundancy, would require a fully redundant communication system.

However, such communication systems are likely to be highly costly, as would the upgraded directors.

SUMMARY OF THE INVENTION

It is an object of the present invention to provide communication between processing units, such as directors, conveniently and at a low cost.

Disclosed are a system and method, employing a data storage device, for providing communication between a plurality of processing units which are respectively unconnected to each other, with the processing units each separately coupled to the data storage device. The data storage device is coupled to the processing units by means of peripheral interfaces. The data storage device comprises a plurality of storage interfaces, each coupled to one of the processing units for receiving commands and signals sent from each of the processing units and for supplying signals to each of the processing units, and a buffer. A controller coupled to the storage interfaces and to the buffer, recognizes "broadcast" commands and any message accompanying the "broadcast" commands, and recognizes "read message" commands, the commands and messages received from the processing units at the storage interfaces. The controller stores the message accompanying the "broadcast" command in the buffer, and the controller forwards, at the storage interfaces, a "message ready" signal to at least one of the processing units. The processing units then send a "read message" command to the data storage device. The controller responds to a "read message" command at one of the storage interfaces, supplying the message stored in the buffer at the storage interface to the sending processing unit.

The "broadcast" command may be additionally accompanied by at least one address designating at least one of the processing units. The controller forwards the "message ready" signal to only the processing unit or units designated by the addresses.

The message accompanying the received "broadcast" command comprises commands and/or signals and may comprise a unique identifier of the message. Upon the message being supplied to a plurality of data storage devices and each supplying the unique identifier as part of the message, the directors employ the unique identifier to identify and ignore any duplicate copies of the message supplied from the data storage devices.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
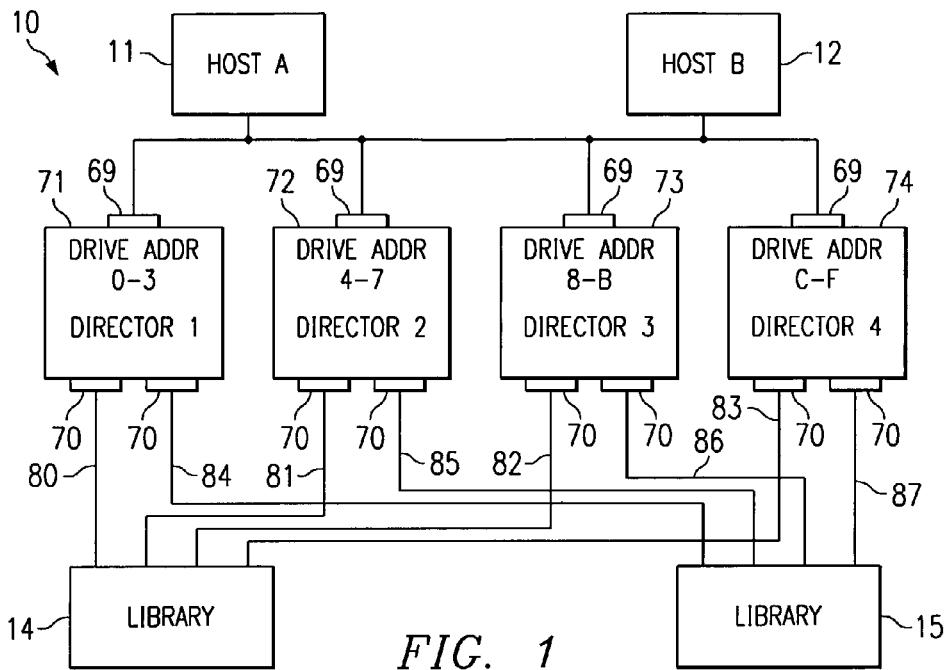
FIG. 1 is a block diagram showing interconnection of functional components of a data storage library system in accordance with an embodiment of the present invention.

Referring to FIG. 1, a data storage system 10 is illustrated which couples host systems 11 and 12 to data storage devices 14 and 15, via a plurality of processing units 71–74. In one embodiment of the invention, the data storage devices 14–15 are data storage libraries, and the processing units 71–74 are directors.

The host systems 11 and 12 may be embodied by a variety of types and numbers of processing units, servers, or computing systems. The data storage libraries 14 and 15 may comprise any similar libraries for storing removable rewritable data storage media, such as tape cartridges or optical disks. An example of a suitable data storage library is the IBM 3494 Virtual Tape Storage System.

Figure 2:
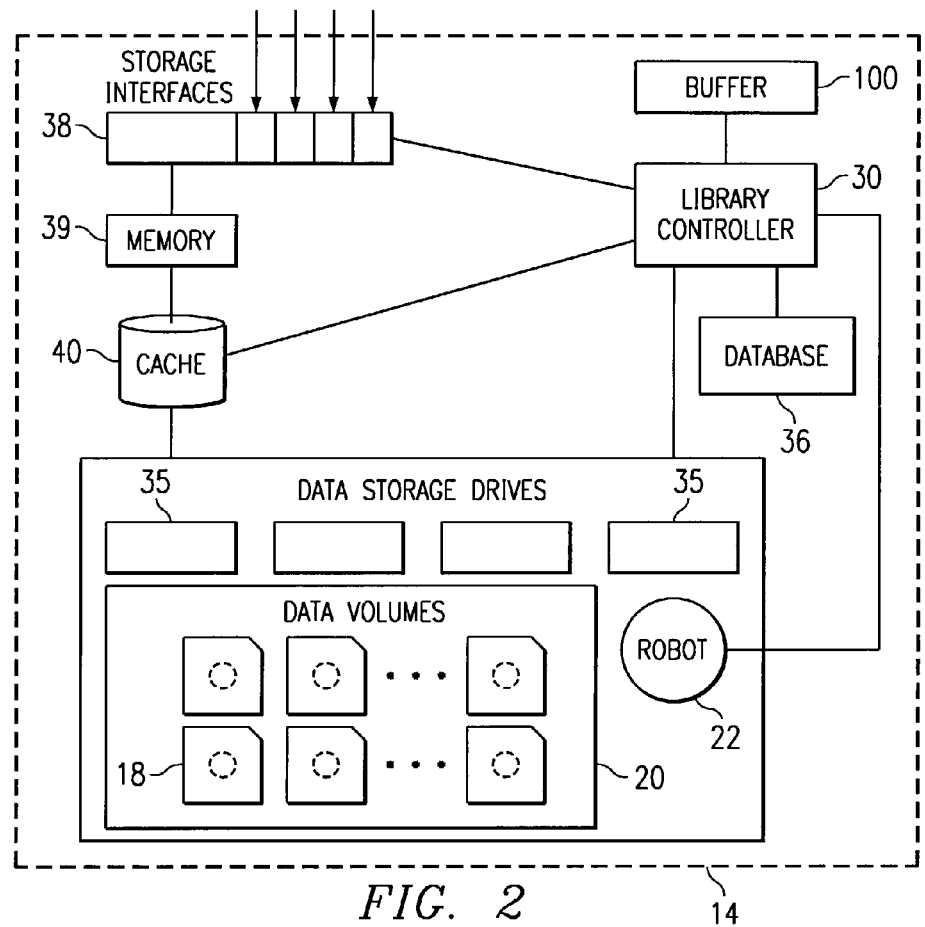
FIG. 2 is a block diagram showing function components of an example of a data storage library of FIG. 1.

Referring additionally to FIG. 2, data storage libraries 14 and 15 provide storage and access to large quantities of data volumes 18 stored in removable data storage media, the media stored in storage shelves 20 which are accessed by at least one robot 22 under the control of a library controller 30. A plurality of data storage drives 35 are included in the library to allow access to read and/or write data volumes 18. The library controller 30 may include a library manager which utilizes a database 36 to track each data volume and the data storage media on which it is stored, and to track the storage shelf location 20 of each data storage media. Communication with the library is conducted at peripheral storage interfaces 38, which are coupled to each of the directors at separate processor unit interfaces 70.

Hosts typically communicate with a data storage library to access an identified data volume, and provide the address of the particular data storage drive 35 that a host desires that the data volume be delivered to. The library controller 30 identifies the data storage media and the storage shelf 20 containing the data volume. The library controller then operates the robot 22 to access the data storage media from the storage shelf and to deliver the data storage media to the addressed drive 35. When the data storage media containing the identified data volume 18 is delivered to the addressed drive, and physically mounted on the drive, the library controller 30 provides a "READY" signal at storage interface 38 to the addressing host. The data volume is then typically read and/or written by the addressing host via data transfer at the storage interface 38.

The assignee of the present invention has introduced tape libraries which are Virtual Tape Servers for handling data transfers with tape drives functioning with high bursts of activity, and for quickly transferring data to a library without waiting for the data storage media to be loaded. The hosts address desired tape drives 35 in the library, but the Virtual Tape Server actually has a cache memory 40 which is treated as though it is a number of tape drives with mounted media. The cache memory tape drives are "virtual drives". Thus, when a host processor reads a data volume 18 from a tape, it remains stored as a file in the cache memory 40 at an address of the virtual drive. Similarly, when a host migrates data volumes to a tape drive, the data volumes are first stored at the cache memory virtual drive 40 and then stored in the tape media at a library tape drive 35. The data remains in the cache memory 40 for a period of time, managed by the Virtual Tape Server library controller 30, and is available for immediate access by the host without waiting for the tape media to be accessed by the robot 22 and mounted on the library tape drive 35.

The directors 71–74 are described in detail in the incorporated Day et al. application, each separate from and coupled to the hosts 11–12 at communication interfaces 69, and each separate from and coupled to each data storage library 14–15. Each director responds to separate, partitioned data storage drive addresses addressed by the hosts at the communication interfaces. For example, director 71 responds to drive addresses 0–3, director 72 responds to drive addresses 4–7, director 73 responds to drive addresses 8-B, and director 74 responds to drive addresses C–F.

Each director 71–74 is a data processor with interfaces appropriate to the connections to the hosts 11–12 and to the libraries 14–15, such as ESCON or SCSI, but without a display, and comprises, for example, an IBM RS-6000 processor.

Each director 71–74 is separately coupled to each data storage library 14–15, and there is no direct communication link between the directors. As discussed above, such a direct communication link would be expensive and would require additional programming capability beyond that of the incorporated Day et al. application. Specifically, library 14 is separately coupled to each of the directors 71–74 by means of peripheral links 80–83, and library 15 is separately coupled to each of the directors 71–74 by means of peripheral links 84–87.

Figure 3:
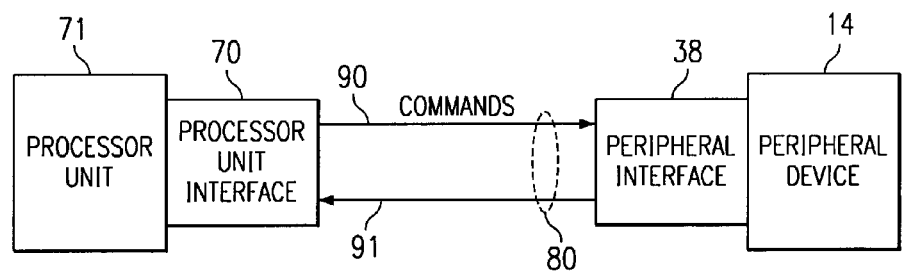
FIG. 3 is a block diagram showing a peripheral interface interconnection of FIG. 1.

Peripheral links are described in more detail with respect to FIG. 3. Examples of peripheral links are ESCON and SCSI, both of which comprise standardized peripheral interfaces, standardized communication links, and standardized protocols. Using processor unit 71 and peripheral device or data storage library 14 as examples, the peripheral interfaces allow a channel or initiator 70 to direct commands on connection 90 of link 80, possibly together with other signals or messages, to the peripheral or target at the storage or peripheral interface 38. The peripheral device cannot send any commands to the channel or initiator. The peripheral device 14 can only send signals or messages to the channel or initiator on connection 91 of link 80. The signals may be called "ATTENTION" signals, and may have various codes indicating the type of attention. When the processor unit 71 desires to access data from the peripheral device 14, the processor sends a "READ MESSAGE" command to the peripheral device, and reads the message as read and presented on connection 91 to the processor unit interface 70 by the peripheral interface 38.

As discussed above, the present invention employs such standard interfaces and protocols to employ peripheral devices to provide communication between unconnected processor units.

The invention is advantageously employed with data storage libraries as discussed in the incorporated Day et al. application, the libraries storing removable data storage media. In the Day et al. application, a plurality of directors are provided, each separate from and coupled to the hosts and each separate from and coupled to each data storage library. Each director receives commands relating to identifiable data volumes, and each director responds to separate, partitioned access addresses addressed by the hosts. The responding director additionally responds to any accompanying data volume supplied by the addressing host, in turn supplying the command and accompanying data volume to all of the plurality of data storage libraries, and the responding director updates each synchronization token directly associated with the supplied data volume. The synchronization tokens may comprise incrementable integers, which are updated by the responding director by incrementing each synchronization token directly associated with the supplied data volume. The responding director may increment each synchronization token directly associated with the same supplied data volume to the same integer value. The director may determine the integer value by comparing the previous integer value of each synchronization token directly associated with the supplied data volume, and setting the synchronization tokens to a value incremented beyond the most current integer value indicated by the comparison. Thus, in accordance with the incorporated Day et al. application, the directors appear as a single library with respect to the host, and store duplicate copies of the data volume in the data storage libraries without involvement by the host. The currency of the data volumes are each tracked by means of the synchronization token, and the synchronization token is directly associated with the data volume, and is not tracked by the host and does not require a central tracking database.

During operation of the system, a data volume may be newly written to one data storage library, but not to the other library, for example, because the other library may be temporarily unavailable. The responding director will subsequently update the data volume, but the data volume at the other library will be down level. It may thus be necessary to notify the other directors that the data volume is down level so that the data is not used by another host system, for example, as soon as the other library becomes available.

It would therefore be advantageous if the directors could communicate with one another so as to communicate the fact of the down level data volume. The present invention provides this communication without the necessity of providing sophisticated directors, and without providing a direct specialized data link between the directors.

Additionally, the present invention may be used for other purposes in the system. Manipulation of synchronization tokens is one key example discussed herein.

Figure 4:
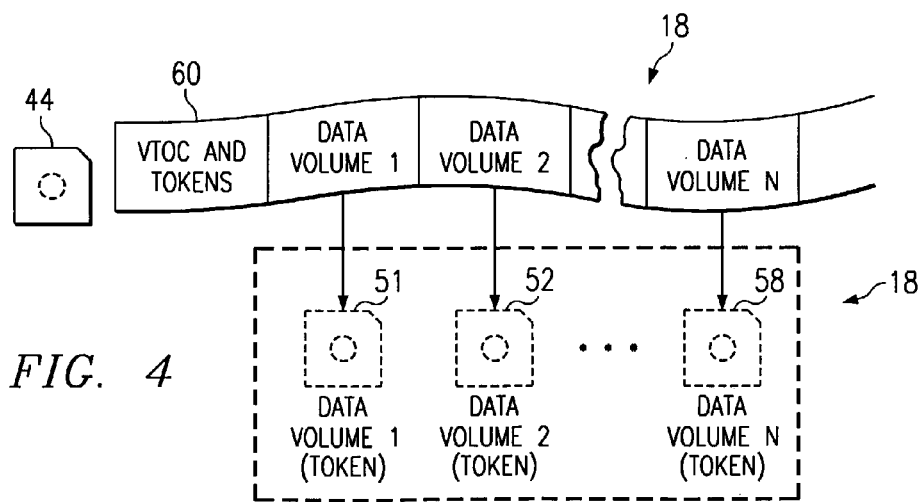
FIG. 4 is a generalized diagram of logical data volumes stored on a single physical volume for use in a data storage library of FIGS. 1 and 2.

Typically, in removable data storage libraries, a plurality of data volumes 18 are stored on a single physical data storage media, called a physical volume. FIG. 4 is a schematic representation of a physical volume 44, such as a magnetic tape in a cartridge, which contains N logical volumes, thereby replacing N individual tape cartridges 51 through 58. The storage of multiple logical data volumes in a single physical volume is called "volume stacking". In one configuration, a single physical volume can include up to 140 logical volumes of 50 MB each, each of which can be individually addressed and accessed. In another configuration a single physical volume can include a variable number of logical data volumes of variable size, each of which can be individually addressed and accessed. Herein, a data volume 18 may comprise a logical volume 51, etc., or, if no logical volumes are provided, a data volume 18 may comprise a physical volume 44.

The key identifier for both logical data volumes and physical volumes is the "Volume Serial Number" or "VOLSER", comprising a predetermined number of characters or blanks. Most physical volumes have the VOLSER, or a similar identifier which is translatable to a VOLSER, encoded in a label which is on the side of the media (cartridge) which is readable by the library robot. Thus, physical volume 44 will have a VOLSER as will the logical data volumes 51 through 58. The typical data storage media 44 includes an index or a volume table of contents (VTOC) 60 which identifies each of the data volumes 18 stored on the physical volume.

In the Day et al. application, the library controller 30 provides the synchronization token directly associated with each data volume, the synchronization token comprising an updatable token. Referring to FIG. 4, the synchronization tokens may be directly associated with data volumes 18 by storing the tokens with the VTOC 60 for each physical volume 44, or alternatively may be stored directly with each data volume 51–58. The synchronization tokens may be stored in tables with each library 15 and 14, respectively, in the database 36 of the library controller 30.

Referring to FIG. 2, the present invention is implementable with program code supplied to the library controller 30, and employing a buffer 100, which comprises a segmented area of the memory of the controller. The present invention employs existing peripheral interface protocols, and adds a specific code to indicate that a message is being supplied to the data storage library that is to be distributed to the directors 71–74.

Each data storage device or library 14 and 15 is provided with an operating system and application programs for operating in accordance with the present invention. The application programs may comprise a computer program product, comprising computer readable program code. The computer program product may be supplied electronically, as from a network or one of the hosts 11–12 at a communications interface. Alternatively, the computer program product may be supplied at an I/O station of the processor or from a data storage library from a storage media which stores executable computer instructions, and comprises an article of manufacture, such as data storage media 44 in FIG. 4. Another example of a storage media which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions.

Figure 5:
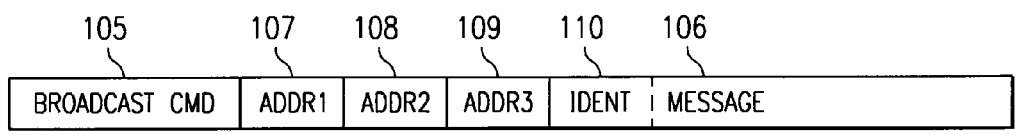
FIG. 5 is a diagrammatic representation of an embodiment of a "broadcast" command and accompanying message in accordance with the present invention.

One embodiment of a command and accompanying message from a director 71–74 is illustrated in FIG. 5. The command is a "BROADCAST" command 105, which may, for example, comprise a standard "WRITE CONTROL COMMAND" with a special code.

Referring to FIGS. 2, 3 and 5, in accordance with the present invention, the "BROADCAST" command 105 and an accompanying message 106 are sent by the processor unit or director 71–74 to the connected peripheral or storage interface 38 of the peripheral or data storage device. The controller 30 coupled to the storage interface, recognizes the "BROADCAST" command 105 and any message 106 accompanying the "BROADCAST" command. The controller stores the message accompanying the "BROADCAST" command in the buffer 100, and the controller forwards, at the storage interfaces 38, a "MESSAGE READY" signal to at least one of the processing units 71–74. The processing units then send a "READ MESSAGE" command to the data storage device. The controller 30 recognizes and responds to the "READ MESSAGE" commands received asynchronously from the processing units 71–74 at the storage interfaces 38, supplying the message 106 stored in the buffer 100 at the storage interface to the sending processing unit.

The "BROADCAST" command may be additionally accompanied by one or more addresses 107–109 designating at least one of the processing units. The controller 30 thus forwards the "MESSAGE READY" signal to only the processing unit or units designated by the addresses.

The message 106 accompanying the received "BROADCAST" command comprises commands and/or signals and may comprise an unique identifier 110 of the message. The unique identifier is generated by the sending director, and may comprise a multibit character including a director identifier and a time stamp. Thus, upon the message being supplied to both data storage devices 14 and 15, and each supplying the unique identifier 110 as part of the message, the directors employ the unique identifier to identify and ignore any duplicate copies of the message supplied from the data storage devices.

Those of skill in the art may envision alternative arrangements of the "BROADCAST", "MESSAGE READY" and "READ MESSAGE" commands and signal.

Figure 6:
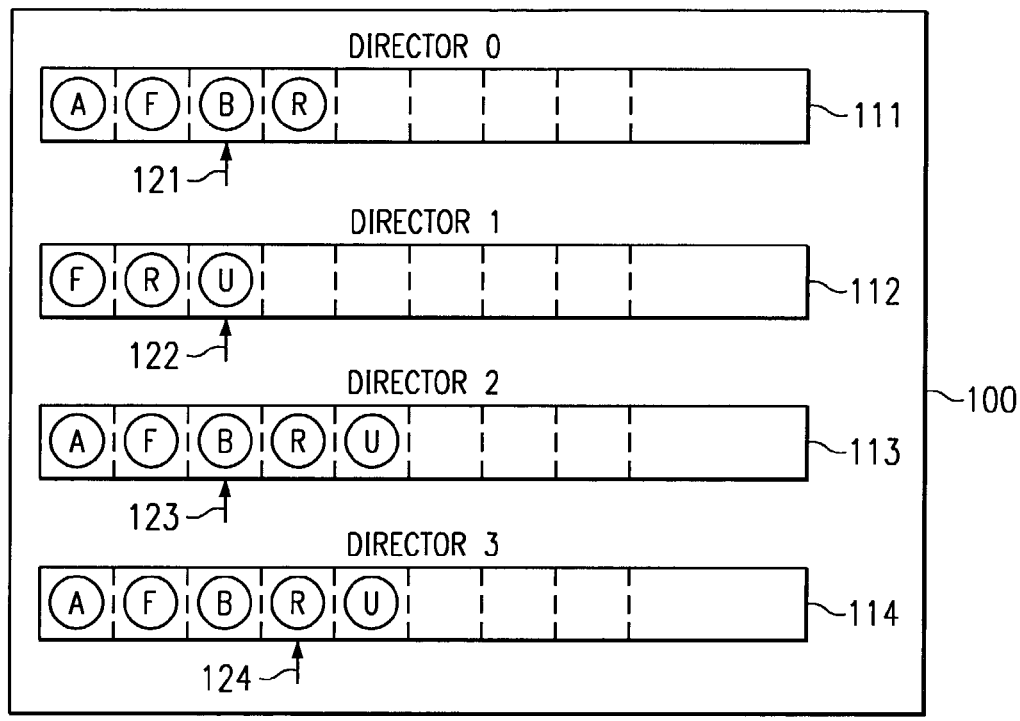
FIG. 6 is a diagrammatic representation of an embodiment of the contents of a buffer of the data storage device of FIG. 2.

FIG. 6 illustrates one embodiment of the contents of buffer 100 of FIG. 2. The buffer is partitioned into separate segments 111–114, one for each director 71–74 of FIG. 1. Thus, director "1" 72 has sent message "A" addressed to directors "0", "2" and "3". One of the directors has sent a message "F" without an address, and it is forwarded to all directors, including the sending director. In this case, the sending director will employ the unique identifier to compare to its sending unique identifiers, and, if there is a match, will ignore the message. Director "1" 72 has sent message "B" addressed to directors "0", "2" and "3", and one of the directors has sent a message "R" without an address, and it is forwarded to all directors. Lastly, director "0" 71 has sent message "U" addressed to directors "1", "2" and "3".

Thus, the controller 30 forwards a "MESSAGE READY" signal to the directors for each of the messages in the buffer 100. A "MESSAGE READY" signal may comprise a standard "ATTENTION" signal with a special code or status value to indicate that a message is at the data storage library and is ready to be read by the director.

The directors 71–74 asynchronously respond to the "MESSAGE READY" signals, sending "READ MESSAGE" commands to the storage interfaces 38. The "READ MESSAGE" command may comprise a standard "READ CONTROL DATA" command with a special code to indicate that the next message in buffer 100 for the sending director is to be read. The controller 30 employs a pointer 121–124 for each buffer segment 111–114 to indicate the next message to be read by the respective director 71–74. Upon a director sending a "READ MESSAGE" command, the controller uses the pointer for that director and supplies the message to the storage interface for that director to be read by the respective director. Thus, the directors do not necessarily track individual messages. Rather, they note that a "MESSAGE READY" signal has been received from a data storage library 14 or 15 and queue and send a "READ MESSAGE" command. In the embodiment of FIG. 6, message "B" is to be sent to director "0", message "U" is to be sent to director "1", message "B" is also to be sent to director "2", and message "R" is to be sent to director "3". Using director "3" 74 as an example, upon director "3" reading message "R", the pointer 124 shifts to message "U". Upon receipt of a new "BROADCAST" command, the new message is added to the end of the set of messages. Upon reaching the end of the buffer segment 111–114, the new messages may overwrite the oldest previous messages.

Figure 7:
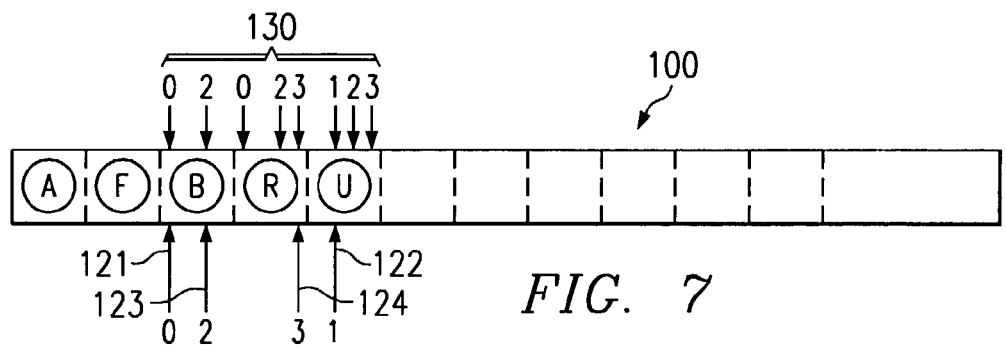
FIG. 7 is a diagrammatic representation of an alternative embodiment of the contents of a buffer of the data storage device of FIG. 2.

FIG. 7 illustrates an alternative embodiment of the contents of buffer 100, which is not partitioned into segments. Instead, controller 30 provides pointers 130 which point to every active and unread message for a director, and provides pointers 121–124, which point to the next message to be read by each respective director. Thus, upon director "0" 71 reading message "B", pointer "0" 130 at message "B" is deleted, and pointer 121 moves to the next active "0" pointer 130, which is located at message "R".

New messages are added to the buffer 100 and pointers 130 added to the message for each director which is addressed, or a pointer is added for all directors if no address is supplied.

Those of skill in the art may envision further alternative arrangements of buffer 100.

Throughout storage and processing of the messages, the data storage device treats each message, including the unique identifier, as a stream of bytes without meaning.

Figure 8:
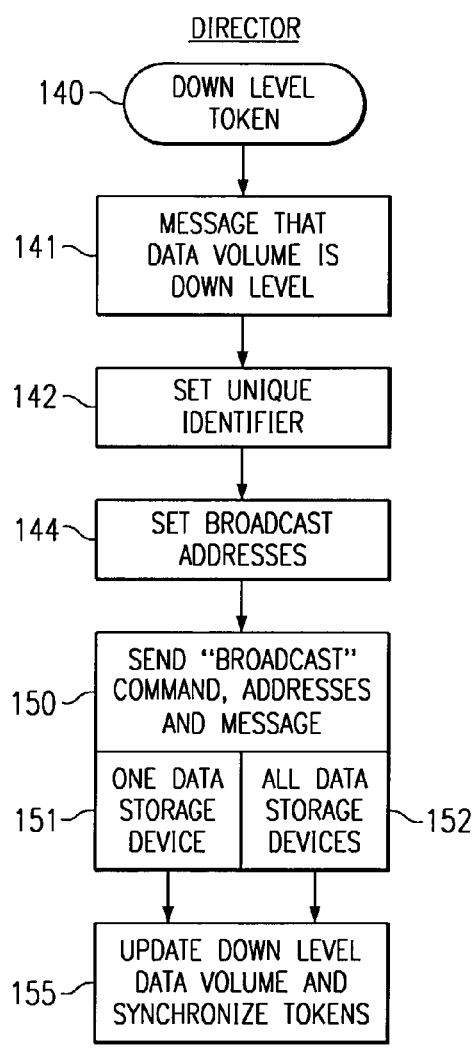
FIGS. 8–10 are flow charts depicting an embodiment of the method of the present invention for providing communication between unconnected processing units by data storage devices.
Figure 9:
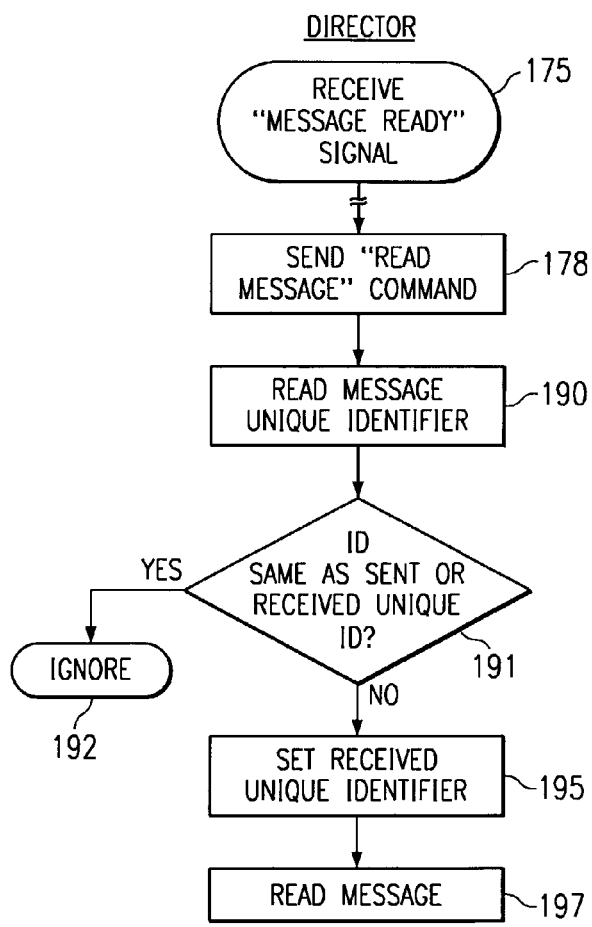
Figure 10:
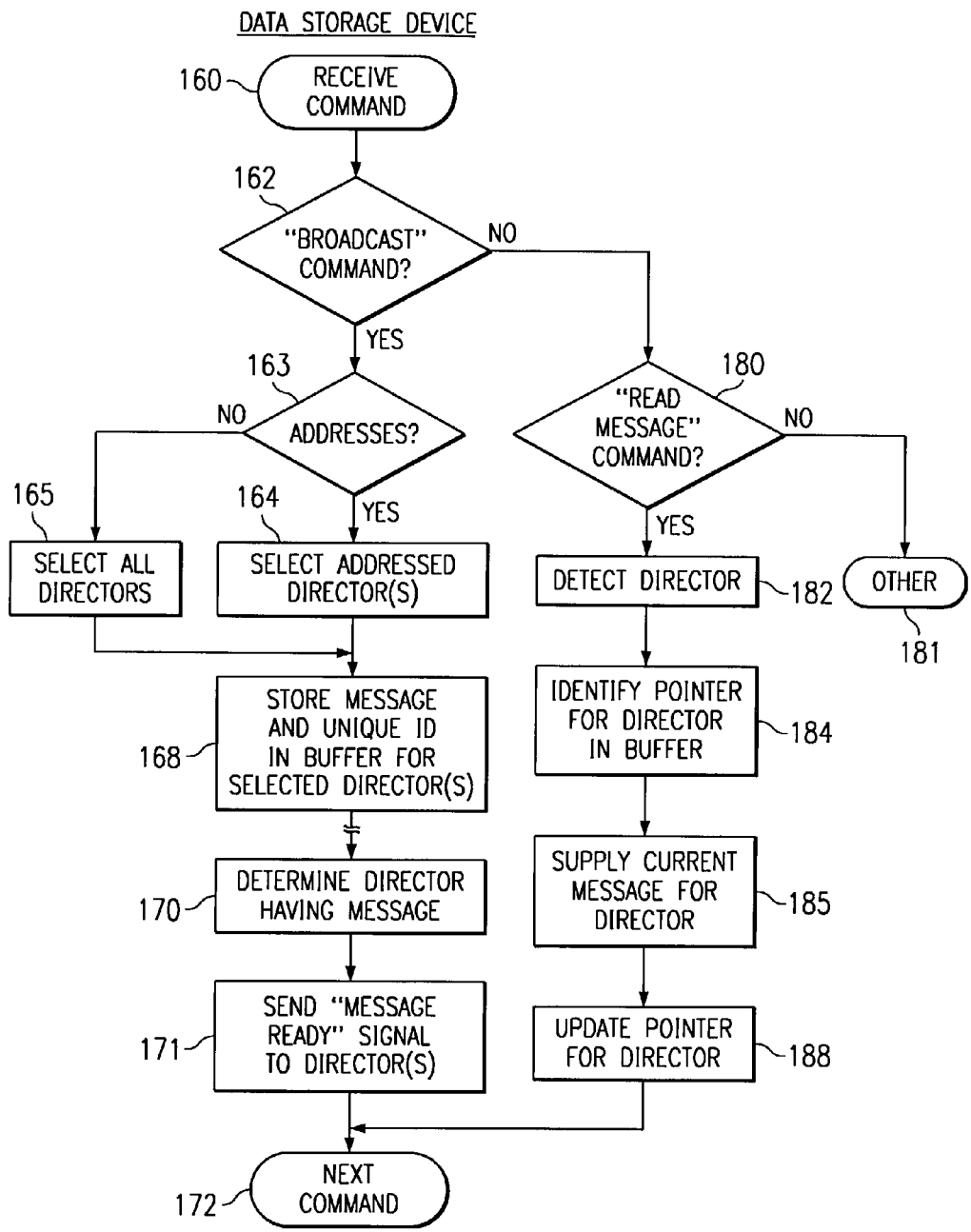

FIGS. 8–10 illustrate one embodiment of the method of the present invention.

A down level token is selected as the example of a need to provide a "BROADCAST" command and accompanying message, in step 140. Those of skill in the art may envision other requirements for communication between the directors 71–74, or between processor units.

Referring additionally to FIGS. 1–7, a director 71–74, in step 141, defines the appropriate message, and, in step 142, sets the unique identifier for the message. As discussed above, the unique identifier may include, for example, an identifier of the director and an encoded number, such as a time stamp which will not repeat for the maximum number of messages for the full length of the buffer 100. Alternative examples of unique identifiers may be envisioned by those of skill in the art.

The director then sets, in step 144, the addresses of the directors which are to be supplied the message. As discussed above, an alternative approach is to employ no addresses, in which case the message will be addressed to all directors, including the sending director.

Once the "BROADCAST" command 105, any accompanying addresses 107–109, the accompanying message 106, and the unique identifier 110 have been assembled by the director 71–74, the director, in step 150, sends the command, addresses and message. The director sends the command and message to one data storage device, step 151, or, alternatively, sends the command and message to both data storage devices, step 152. The choice between steps 151 and 152 may be made on the basis of the need for redundancy, or may be made in accordance with the arrangement of the data storage libraries of the Day et al. application. Specifically, the data storage libraries may comprise a "MASTER/SLAVE" arrangement in which a director always sends commands to the designated "MASTER" data storage library and not to the designated "SLAVE" library, in which case step 151 is employed. Those of skill in the art may envision other circumstances for making the choice between step 151 and step 152.

The director 71–74 sends the command 105 and message 106 from the processor unit interface 70 on connection 90 of link 80–87 to the respective storage interface 38 of the data storage library or libraries 14–15. Then, in step 155, the sending director conducts the process of the Day et al. application for updating the down level data volume 51–58 and synchronizing the synchronization token 60 directly associated with the data volume.

FIG. 10 illustrates an embodiment of the method of the present invention implemented at one of the data storage libraries 14–15. Referring additionally to FIGS. 1–7, the data storage library receives the command from the sending director at the respective storage interface 38, in step 160. In step 162, the library controller 30 determines whether the received command is a "BROADCAST" command 105, recognizing the "BROADCAST" command, "YES", and, in step 163, determines whether any addresses 107–109 accompany the command.

If any address of a director 71–74 accompanies the command, "YES", the library controller 30 selects the addressed director(s). If no address 107–109 accompanies the command, "NO", the library controller 30 selects all of the directors 71–74 for sending the "MESSAGE READY" signal.

In step 168, the library controller 30 stores the message 106 accompanying the command and the unique identifier 110 in the buffer 100 at the partitioned segment 111–114 of FIG. 6, or in the unsegmented buffer of FIG. 7, for the director(s) selected in step 164 or in step 165.

Subsequently and asynchronously, the library controller 30, in step 170, employs pointers 121–124 to determine the directors having a message. Then, in step 171, the library controller 30 causes the storage interface 38 to send a "MESSAGE READY" signal to the appropriate director(s) at their processor unit interfaces 70, and sequences to step 172 to process the next command.

Referring to FIG. 9, the selected director(s) 71–74 receive the "MESSAGE READY" signal in step 175. Subsequently and asynchronously, depending on other processing, the director 71–74 sends a "READ MESSAGE" command to the data storage library in step 178.

Referring to FIG. 10, the data storage library 14–15 receives the command in step 160 at the storage interface 38, and, in step 162, the library controller 30 determines whether the command is a "BROADCAST" command. Since it is not a "BROADCAST" command, "NO", the library controller, in step 180, determines whether the received command is a "READ MESSAGE" command. If step 180 determines that the command is not a "READ MESSAGE" command, "NO", the command is processed in step 181.

If the library controller 30 recognizes the command as a "READ MESSAGE" command, "YES" in step 180, the library controller 30 detects, in step 182, the sending director 71–74. In step 184, the library controller 30 identifies the current pointer 121–124 for the detected director in the buffer 100, and, in step 185, supplies the current message 106 for the director at the respective storage interface 38, including the unique identifier 110. The library controller 30 then, in step 188, updates the pointer 121–124 for the director in the buffer 100, by moving to the next message for the director. The library controller then cycles to step 172 and processes the next command.

Referring again to FIG. 9, the director 71–74 that sent the "READ MESSAGE" command to the data storage library, in step 190, reads the unique identifier 110 of the supplied message 106. In step 191, the director compares the unique identifier with other recently detected unique identifiers to determine whether the unique identifier represents a message sent by the director or is a duplicate message that had been previously read from another data storage library. The director stores the unique identifiers in an allocated memory partition, overwriting older identifiers. If step 191 indicates a match, "YES", the director, in step 192, ignores the message, not reading the message as supplied at the data storage library storage interface 38. Alternatively, the entire message, including the unique identifier, may be read in step 190 and the message left in a memory partition without being processed in step 192.

If the unique identifier is new and does not match a previous identifier in step 191, "NO", the director, in step 195, sets the received unique identifier in the allocated memory partition.

Then, in step 197, the director reads the message 106 supplied at the storage interface 38 of the supplying data storage library 14–15, or, if the message has been read at step 190, the director then processes the read message.

Those of skill in the art may envision alternative arrangements of the specific steps and the ordering of the steps of the present invention discussed above. Additionally, those of skill in the art may envision other applications of the present invention to processor units 71 in which the present invention would advantageously provide a low cost and convenient means of communication between the processor units.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for communicating among a plurality of processing units, said processing units respectively unconnected to each other, said processing units each separately coupled to at least one separate data storage device, said data storage devices respectively unconnected to each other, said data storage devices each having a buffer, said method comprising the steps of:

receiving, at one of said separate data storage devices, a "broadcast" command from one of said processing units, said command accompanied by a message;

storing said received accompanying message in said buffer in said one data storage device;

forwarding, from said one data storage device, a "message ready" signal to at least another of said processing units than said one processing unit;

receiving, at said one data storage device, "read message" commands sent from said at least another processing unit; and supplying, from said one data storage device in response to each said received "read message" command, said message stored in said buffer to said sending processing unit.

2. The method of claim 1, wherein said "broadcast" command is additionally accompanied by at least one address designating at least one of said processing units, and wherein said forwarding step comprises forwarding said "message ready" signal to only said at least one of said processing units designated by said at least one address.

3. The method of claim 1, wherein said processing units are each coupled to said at least one data storage device by a peripheral interface in which said commands of said receiving steps are directed only from said processing units to said data storage device.

4. The method of claim 1, wherein said supplying step is separately conducted subsequent to said receiving step asynchronously with respect to each said sending processing unit.

5. The method of claim 1, wherein said at least one data storage device treats said received and stored accompanying message as a stream of bytes without meaning.

6. The method of claim 5, wherein said at least one data storage device comprises a data storage library.

7. A method for communicating among a plurality of processing units, said processing units respectively unconnected to each other, said processing units each separately coupled to at least one separate data storage device, said data storage devices respectively unconnected to each other, said data storage devices each having a buffer, said method comprising the steps of:
receiving, at one of said separate data storage devices, a "broadcast" command from one of said processing units, said command accompanied by a message;
storing said received accompanying message in said buffer in said one data storage device;
forwarding, from said one data storage device, a "message ready" signal to at least one of said processing units;
receiving, at said one data storage device, "read message" commands sent from said at least one processing unit; and
supplying, in response to each said received "read message" command, said message stored in said buffer to said sending processing unit;
wherein said "broadcast" command receiving step received accompanying message comprises commands and/or signals directed to other of said processing units than said one processing unit, wherein said forwarding step forwards said "message ready" signal to said one processing unit and to said other processing units, and wherein said message supplied to said one processing unit in said supplying step is ignored by said one processing unit as not directed to said one processing unit.

8. A method for communicating among a plurality of directors, said directors respectively unconnected to each other, said directors each separately coupled to a plurality of separate data storage devices, said data storage devices respectively unconnected to each other, said data storage devices each having a buffer, said method comprising the steps of:
receiving, at each of said plurality of separate data storage devices, a "broadcast" command from one of said directors, said command accompanied by a message;
storing, at each of said plurality of data storage devices, said received accompanying message in said buffer;
forwarding, from each of said plurality of data storage devices, a "message ready" signal to at least another of said directors than said one director;
receiving, at said plurality of data storage devices, "read message" commands sent from said at least another director; and
supplying, from said plurality of data storage devices in response to each said received "read message" command, said message stored in said buffer to said sending director.

9. The method of claim 8, wherein said "broadcast" command of said "broadcast" command receiving step is additionally accompanied by at least one address designating at least one of said directors, and wherein said forwarding step comprises forwarding said "message ready" signal to only said at least one of said directors designated by said at least one address.

10. The method of claim 8, wherein said directors are each coupled to said data storage devices by a peripheral interface in which said commands of said receiving steps are directed only from said directors to said data storage devices.

11. The method of claim 8, wherein said supplying step is separately conducted subsequent to said receiving step asynchronously with respect to each said sending director.

12. The method of claim 8, wherein said at least one data storage device treats said received and stored accompanying message as a stream of bytes without meaning.

13. The method of claim 12, wherein said at least one data storage device comprises a data storage library.

14. A method for communicating among a plurality of directors, said directors respectively unconnected to each other, said directors each separately coupled to a plurality of separate data storage devices, said data storage devices respectively unconnected to each other, said data storage devices each having a buffer, said method comprising the steps of:
receiving, at each of said plurality of separate data storage devices, a "broadcast" command from one of said directors, said command accompanied by a message;
storing, at each of said plurality of data storage devices, said received accompanying message in said buffer;
forwarding, from each of said plurality of data storage devices, a "message ready" signal to at least one of said directors;
receiving, at said plurality of data storage devices, "read message" commands sent from said at least one director; and
supplying, in response to each said received "read message" command, said message stored in said buffer to said sending director;
wherein said "broadcast" command receiving step received accompanying message comprises commands and/or signals and an unique identifier of said message, wherein said forwarding step forwards said "message ready" signal to said one director and to said other directors, and wherein said message supplying step additionally comprises supplying said unique identifier of said message, whereby said one director ignores said message as not directed to said one director, and said directors ignore any duplicate copies of said message supplied from said plurality of data storage devices.

15. A method for communicating among a plurality of directors, said directors respectively unconnected to each other, said directors each separately coupled to a plurality of separate data storage devices, said data storage devices respectively unconnected to each other, said data storage devices each having a buffer, said method comprising the steps of:

receiving, at each of said plurality of separate data storage devices, a "broadcast" command from one of said directors, said command accompanied by a message;

storing, at each of said plurality of data storage devices, said received accompanying message in said buffer;

forwarding, from each of said plurality of data storage devices, a "message ready" signal to at least one of said directors;

receiving, at said plurality of data storage devices, "read message" commands sent from said at least one director; and supplying, in response to each said received "read message" command, said message stored in said buffer to said sending director;

wherein said "broadcast" command of said "broadcast" command receiving step is additionally accompanied by at least one address designating at least one of said directors, and wherein said forwarding step comprises forwarding said "message ready" signal to only said at least one of said directors designated by said at least one address;

wherein said "broadcast" command receiving step received accompanying message comprises commands and/or signals and an unique identifier of said message, wherein said message supplying step additionally comprises supplying said unique identifier of said message, whereby said directors ignore any duplicate copies of said message supplied from said plurality of data storage devices.

16. A data storage device for providing communication between a plurality of processing units, said processing units respectively unconnected to each other, said processing units each separately coupled to said data storage device, comprising:

a plurality of storage interfaces, each coupled to one of said processing units for receiving commands and signals sent from each of said processing units and for supplying signals to each of said processing units;

a buffer; and a controller coupled to said storage interfaces and to said buffer, for recognizing "broadcast" commands and any message accompanying said "broadcast" commands, and recognizing "read message" commands, said commands and messages received from said processing units at said storage interfaces; said controller storing said message accompanying said "broadcast" command in said buffer; said controller forwarding, at said storage interfaces, a "message ready" signal to at least another of said processing units than said processing unit sending said "broadcast" command and message; said controller responding to a "read message" command at one of said storage interfaces, supplying said message stored in said buffer at said storage interface to said "read message" command sending processing unit.

17. The data storage device of claim 16, wherein said "broadcast" command recognized by said controller is additionally accompanied by at least one address designating at least one of said processing units, and wherein said controller forwards said "message ready" signal to only at least one of said plurality of processing units designated by said at least one address.

18. The data storage device of claim 16, wherein said storage interfaces each comprises a peripheral interface in which said commands are directed only from said processing units to said data storage device.

19. The data storage device of claim 16, wherein said controller stores and supplies said "broadcast" command accompanying message as a stream of bytes without meaning.

20. A data storage device for providing communication between a plurality of processing units, said processing units respectively unconnected to each other, said processing units each separately coupled to said data storage device, comprising:

a plurality of storage interfaces, each coupled to one of said processing units for receiving commands and signals sent from each of said processing units and for supplying signals to each of said processing units;

a buffer; and a controller coupled to said storage interfaces and to said buffer, for recognizing "broadcast" commands and any message accompanying said "broadcast" commands, and recognizing "read message" commands, said commands and messages received from said processing units at said storage interfaces; said controller storing said message accompanying said "broadcast" command in said buffer; said controller forwarding, at said storage interfaces, a "message ready" signal to at least one of said processing units; said controller responding to a "read message" command at one of said storage interfaces, supplying said message stored in said buffer at said storage interface to said sending processing unit;

wherein said data storage device comprises a data storage library additionally comprising: a plurality of storage shelves, a plurality of data storage media stored on said plurality of storage shelves, and at least one data storage drive for transferring data volumes between said storage interfaces and said data storage media, wherein said storage interfaces receive storage commands from said processing units and supply said storage commands to said controller, for controlling the transfer of said data volumes between said storage interfaces and said data storage media.

21. A data storage device for providing communication between a plurality of processing units, said processing units respectively unconnected to each other, said processing units each separately coupled to said data storage device, comprising:

a plurality of storage interfaces, each coupled to one of said processing units for receiving commands and signals sent from each of said processing units and for supplying signals to each of said processing units;

a buffer; and a controller coupled to said storage interfaces and to said buffer, for recognizing "broadcast" commands and any message accompanying said "broadcast" commands, and recognizing "read message" commands, said commands and messages received from said processing units at said storage interfaces; said controller storing said message accompanying said "broadcast" command in said buffer; said controller forwarding, at said storage interfaces, a "message ready" signal to at least one of said processing units; said controller responding to a "read message" command at one of said storage interfaces, supplying said message stored in said buffer at said storage interface to said sending processing unit;

wherein said "broadcast" command accompanying message recognized by said controller comprises commands and/or signals directed to other of said processing units than said one processing unit; and wherein said controller forwards said "message ready" signal to the sending processing unit and to other of said plurality of processing units; whereby said message supplied to said sending processing unit is ignored by said sending processing unit as not directed to said processing unit.

22. The data storage device of claim 21, wherein said "broadcast" command accompanying message recognized by said controller additionally comprises an unique identifier, and wherein said controller additionally stores said unique identifier in said buffer, and supplies said unique identifier with said message to said processing units at said storage interfaces, whereby said sending processing unit may recognize said unique identifier for ignoring said supplied message.

23. A data storage library system coupled to at least one host, for storing and accessing data volumes on accessed rewritable data storage media, said hosts addressing commands relating to said data volumes using access addresses, comprising:

a plurality of directors, each separate from and coupled to said at least one host, each said director receiving commands from said hosts relating to said data volumes, said directors respectively unconnected to each other, for supplying commands and signals relating to said data volumes, including "broadcast" commands for communicating with other of said directors, said "broadcast" commands accompanied by a message, and "read message" commands; and a plurality of data storage libraries, said data storage libraries respectively unconnected to each other, each said library comprising:

a plurality of storage interfaces, each separately coupled to one of said plurality of directors for receiving commands and signals sent from the corresponding said director and for supplying signals to said corresponding director;

a buffer; and a controller coupled to said storage interfaces and to said buffer, for recognizing said "broadcast" commands and any said message accompanying said "broadcast" commands, and recognizing "read message" commands, said commands and messages received from said directors at said storage interfaces; said controller storing said message accompanying said "broadcast" command in said buffer; said controller forwarding, at said storage interfaces, a "message ready" signal to at least another of said directors than said director supplying said "broadcast" command and message; said controller responding to a "read message" command at one of said storage interfaces, supplying said message stored in said buffer at said storage interface to said "read message" command sending director.

24. The data storage library system of claim 23, wherein said "broadcast" command is additionally accompanied by at least one address designating at least one of said directors, and wherein said receiving data storage library controller forwards said "message ready" signal to only at least one of said plurality of directors designated by said at least one address.

25. The data storage library system of claim 23, wherein said storage interfaces each comprises a peripheral interface in which said commands are directed only from said directors to said data storage device.

26. The data storage library system of claim 23, wherein said receiving data storage library controller stores and supplies said "broadcast" command accompanying message as a stream of bytes without meaning.

27. A data storage library system coupled to at least one host, for storing and accessing data volumes on accessed rewritable data storage media, said hosts addressing commands relating to said data volumes using access addresses, comprising:

a plurality of directors, each separate from and coupled to said at least one host, each said director receiving commands from said hosts relating to said data volumes, said directors respectively unconnected to each other, for supplying commands and signals relating to said data volumes, including "broadcast" commands for communicating with other of said directors, said "broadcast" commands accompanied by a message, and "read message" commands; and a plurality of data storage libraries, said data storage libraries respectively unconnected to each other, each said library comprising:

a plurality of storage interfaces, each separately coupled to one of said plurality of directors for receiving commands and signals sent from the corresponding said director and for supplying signals to said corresponding director;

a buffer; and a controller coupled to said storage interfaces and to said buffer, for recognizing said "broadcast" commands and any said message accompanying said "broadcast" commands, and recognizing "read message" commands, said commands and messages received from said directors at said storage interfaces; said controller storing said message accompanying said "broadcast" command in said buffer; said controller forwarding, at said storage interfaces, a "message ready" signal to at least one of said directors; said controller responding to a "read message" command at one of said storage interfaces, supplying said message stored in said buffer at said storage interface to said sending director; wherein said "broadcast" command accompanying message comprises commands and/or signals directed to other of said directors than said one director; and wherein said receiving data storage library controller forwards said "message ready" signal to the sending director and to other of said plurality of directors; whereby said message supplied to said sending director is ignored by said sending director as not directed to said director.

28. The data storage library system of claim 27, wherein said "broadcast" command accompanying message additionally comprises an unique identifier, and wherein said receiving data storage library controller additionally stores said unique identifier in said buffer, and supplies said unique identifier with said message to said directors at said storage interfaces, whereby said sending director may recognize said unique identifier for ignoring said supplied message.

29. A program product usable with a programmable computer processor of a data storage device having computer readable program code embodied therein for communicating among a plurality of processor units, said processor units respectively unconnected to each other, said processor units each separately coupled to said data storage device, said data storage device having a buffer, comprising:

computer readable program code which causes said programmable computer processor of said data storage device, to receive a "broadcast" command from one of said processor units, said command accompanied by a message;

computer readable program code which causes said programmable computer processor to store said received accompanying message in said buffer in said data storage device;

computer readable program code which causes said programmable computer processor to forward, from said data storage device, a "message ready" signal to at least another of said processor units than said one processor unit;

computer readable program code which causes said programmable computer processor to receive, at said data storage device, "read message" commands sent from said at least another processor unit; and computer readable program code which causes said programmable computer processor to supply, from said data storage device in response to each said received "read message" command, said message stored in said buffer to said sending processor unit.

30. The computer program product of claim 29, wherein said "broadcast" command is additionally accompanied by at least one address designating at least one of said processor units, and wherein said computer readable program code which causes said programmable computer processor to forward said "message ready" signal additionally comprises forwarding said "message ready" signal to only said at least one of said processor units designated by said at least one address.

31. A program product usable with a programmable computer processor of a data storage device having computer readable program code embodied therein for communicating among a plurality of processor units, said processor units respectively unconnected to each other, said processor units each separately coupled to said data storage device, said data storage device having a buffer, comprising:

computer readable program code which causes said programmable computer processor of said data storage device, to receive a "broadcast" command from one of said processor units, said command accompanied by a message;

computer readable program code which causes said programmable computer processor to store said received accompanying message in said buffer in said data storage device;

computer readable program code which causes said programmable computer processor to forward, from said data storage device, a "message ready" signal to at least one of said processor units;

computer readable program code which causes said programmable computer processor to receive, at said data storage device, "read message" commands sent from said at least one processor unit; and computer readable program code which causes said programmable computer processor to supply, in response to each said received "read message" command, said message stored in said buffer to said sending processor unit;

wherein said "broadcast" command accompanying message comprises commands and/or signals and an unique identifier of said message, and wherein said computer readable program code which causes said programmable computer processor to store said message in said buffer and which causes said programmable computer processor to supply said message in said buffer to said sending processor unit additionally comprises respectively storing and supplying said unique identifier of said message, whereby said processor units ignore any duplicate copies of said message, and any copy of said message returned to said one of said processor units.

* * * * *